US010909085B2

(12) United States Patent
Qiu

(10) Patent No.: US 10,909,085 B2
(45) Date of Patent: *Feb. 2, 2021

(54) BLOCKCHAIN-BASED DATA PROCESSING METHOD AND DEVICE

(71) Applicant: Advanced New Technologies Co., Ltd., George Town (KY)

(72) Inventor: Honglin Qiu, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/796,105

(22) Filed: Feb. 20, 2020

(65) Prior Publication Data
US 2020/0183891 A1 Jun. 11, 2020

Related U.S. Application Data

(63) Continuation of application No. 16/586,051, filed on Sep. 27, 2019, which is a continuation of application No. PCT/CN2018/080501, filed on Mar. 26, 2018.

(30) Foreign Application Priority Data

Mar. 28, 2017 (CN) .......................... 2017 1 0190740

(51) Int. Cl.
G06F 16/18 (2019.01)
G06F 16/182 (2019.01)
(Continued)

(52) U.S. Cl.
CPC ........ G06F 16/1824 (2019.01); G06F 9/4881 (2013.01); H04L 9/0637 (2013.01); H04L 2209/56 (2013.01)

(58) Field of Classification Search
CPC ... H04L 9/0637; H04L 9/0643; H04L 9/3247; H04L 9/3236; H04L 2209/38;
(Continued)

(56) References Cited

U.S. PATENT DOCUMENTS

2014/0052734 A1 2/2014 Lee et al.
2016/0246827 A1 8/2016 Deng et al.
(Continued)

FOREIGN PATENT DOCUMENTS

CN 101267288 9/2008
CN 102075930 5/2011
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

Primary Examiner — Robert W Beausoliel, Jr.
Assistant Examiner — Nirav K Khakhar
(74) Attorney, Agent, or Firm — Fish & Richardson P.C.

(57) ABSTRACT

Techniques for processing blockchain data are described. A node in a blockchain network receives service data generated by a first service, wherein the service data comprises a data structure having a field a value of which indicates that the first service is associated with a first processing level. The node stores, based on the value of the field, the service data in a first data processing queue selected from a plurality of data processing queues, wherein the first data processing queue corresponds to the first processing level, and each of the plurality of data processing queues corresponds to a different processing level. The node generates a new block that stores the service data read from the first data processing
(Continued)

queue, and additional service data read from one or more of the plurality of data processing queues.

20 Claims, 6 Drawing Sheets

(51) Int. Cl.
  *G06F 9/48* (2006.01)
  *H04L 9/06* (2006.01)
(58) Field of Classification Search
  CPC ............ H04L 2209/56; G06F 16/1805; G06F 16/27–278
  See application file for complete search history.

(56) References Cited

U.S. PATENT DOCUMENTS

| | | |
|---|---|---|
| 2016/0275461 A1 | 9/2016 | Sprague et al. |
| 2017/0083860 A1 | 3/2017 | Sriram et al. |
| 2019/0019183 A1 | 1/2019 | Karame et al. |

FOREIGN PATENT DOCUMENTS

| | | |
|---|---|---|
| CN | 102970202 | 3/2013 |
| CN | 105007294 | 10/2015 |
| CN | 105975868 | 9/2016 |
| CN | 106156038 | 11/2016 |
| CN | 106411774 | 2/2017 |
| CN | 106446067 | 2/2017 |
| CN | 106528775 | 3/2017 |
| CN | 107391526 | 11/2017 |
| EA | 004078 | 12/2003 |
| JP | 10327186 | 12/1998 |
| JP | 2014038616 | 2/2014 |
| JP | 2015091047 | 5/2015 |
| JP | 2016208347 | 12/2016 |
| KR | 100889056 | 3/2009 |
| KR | 20090074278 | 7/2009 |
| KR | 101701131 | 2/2017 |
| TW | 201627889 | 8/2016 |
| WO | WO 2017021155 | 2/2017 |
| WO | WO 2018026727 | 2/2018 |

OTHER PUBLICATIONS

Extended European Search Report in European Application No. 18775202.7, dated Oct. 22, 2019, 8 pages.

Nakamoto, "Bitcoin: A Peer-to-Peer Electronic Cash System," www.bitcoin.org, 2005, 9 pages.

PCT International Preliminary Report on Patentability in International Application No. PCT/CN2018/080501, dated Oct. 1, 2019, 10 pages (with English translation).

PCT International Search Report and Written Opinion in International Application No. PCT/CN2018/080501, dated May 28, 2018, 16 pages (with English translation).

Kasahara et al., "Effect of Bitcoin fee on transaction-confirmation process," arXiv:1604.00103, Journal of Industrial and Management Optimization, Jan. 2017, 13(5):1-22.

Moeser et al. "'Trends, Tips, Tolls: A Longitudinal Study of Bitcoin Transaction Fees," International Conference on Financial Cryptography and Data Security, Jan. 2015, pp. 19-33.

BLOCKCHAIN-BASED DATA PROCESSING METHOD AND DEVICE

CROSS-REFERENCE TO RELATED APPLICATIONS

This application is a continuation of U.S. patent application Ser. No. 16/586,051, filed on Sep. 27, 2019, which is a continuation of PCT Application No. PCT/CN2018/080501, filed on Mar. 26, 2018, which claims priority to Chinese Patent Application No. 201710190740.X, filed on Mar. 28, 2017, and each application is hereby incorporated by reference in its entirety.

TECHNICAL FIELD

The present application relates to the field of Internet information processing technologies and the field of computer technologies, and in particular, to a blockchain-based data processing method and device.

BACKGROUND

The blockchain technology is also referred to as a distributed ledger technology. As a distributed Internet database technology, the blockchain technology is characterized by decentralization, transparency, non-tampering, and trustworthiness. A network constructed based on the blockchain technology can be referred to as a blockchain network. The blockchain network includes a network node (which can also be referred to as a blockchain node). Each network node corresponds to at least one blockchain, and each blockchain includes at least one block.

When receiving data to be stored, the network node broadcasts the data to be stored to other network nodes in the blockchain network. Therefore, each network node in the blockchain network stores full data of the blockchain network, and data stored on one network node is consistent with that stored on another node.

Data is generally stored in the blockchain network in two stages: In a first stage, the blockchain network receives data to be stored, and broadcasts the data all over the blockchain network. As such, each node in the blockchain network receives the data to be stored. In this case, each network node in the blockchain network writes the data to be stored in a cache. In a second stage, a network node in the blockchain network that obtains permission to store the data to be stored writes the data to be stored in a block when obtaining recording permission, and adds the block to an existing blockchain. It can be seen that the data is stored in the blockchain network by using an asynchronous writing policy.

However, in an actual service scenario, when service data is stored in a blockchain network by using an asynchronous writing policy, generally, a data processing queue is maintained in a first stage, and data to be stored is sequentially written into the data processing queue based on a timestamp of the data to be stored. As such, in a second stage, data to be stored in the data processing queue is written into a block based on a first in first out principle.

According to researches, in the previous method, there are following problems in storing data in the blockchain network: For services with relatively high service priorities, service data processing efficiency is relatively low, and consequently processing efficiency of these services is relatively low.

SUMMARY

In view of the above, implementations of the present application provide a blockchain-based data processing method and device, to alleviate an existing-technology issue of low efficiency of processing service data of a service with a relatively high service priority.

An implementation of the present application provides a blockchain-based data processing method, including the following: obtaining, by a node in a blockchain network, at least one piece of service data generated in a predetermined time period, where the service data includes a processing level of a service that generates the service data; storing, by the node, the service data in a data processing queue that matches the processing level; and separately reading, by the node, service data that satisfies a predetermined condition from different data processing queues when a new block is generated, and storing the read service data in the block.

An implementation of the present application further provides a blockchain-based data processing device, including the following: an acquisition unit, configured to obtain at least one piece of service data generated in a predetermined time period, where the service data includes a processing level of a service that generates the service data; a storage unit, configured to store the service data in a data processing queue that matches the processing level; and a processing unit, configured to separately read service data that satisfies a predetermined condition from different data processing queues when a new block is generated, and store the read service data in the block.

At least one of the previously described technical solutions used in the implementations of the present application can achieve the following beneficial effects:

Different service data is stored in different data processing queues based on processing levels, and a predetermined quantity of service data is read from the different data processing queues based a predetermined condition when storing data in a block, so that the service data with the different processing levels can be processed, an existing-technology rule of processing service data only based on time can be broken, and an existing-technology issue of low efficiency of processing a service with a relatively high service priority can be alleviated. The solution provided in implementations of the present application not only ensures efficiency of processing service data of a service with a high service priority, but also ensures efficiency of processing service data of a service with a low service priority. When a service processing priority is satisfied, the flexibility of processing service data in a blockchain is increased, and the use value of the blockchain in the service application field is also improved.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations and accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Figure 1:
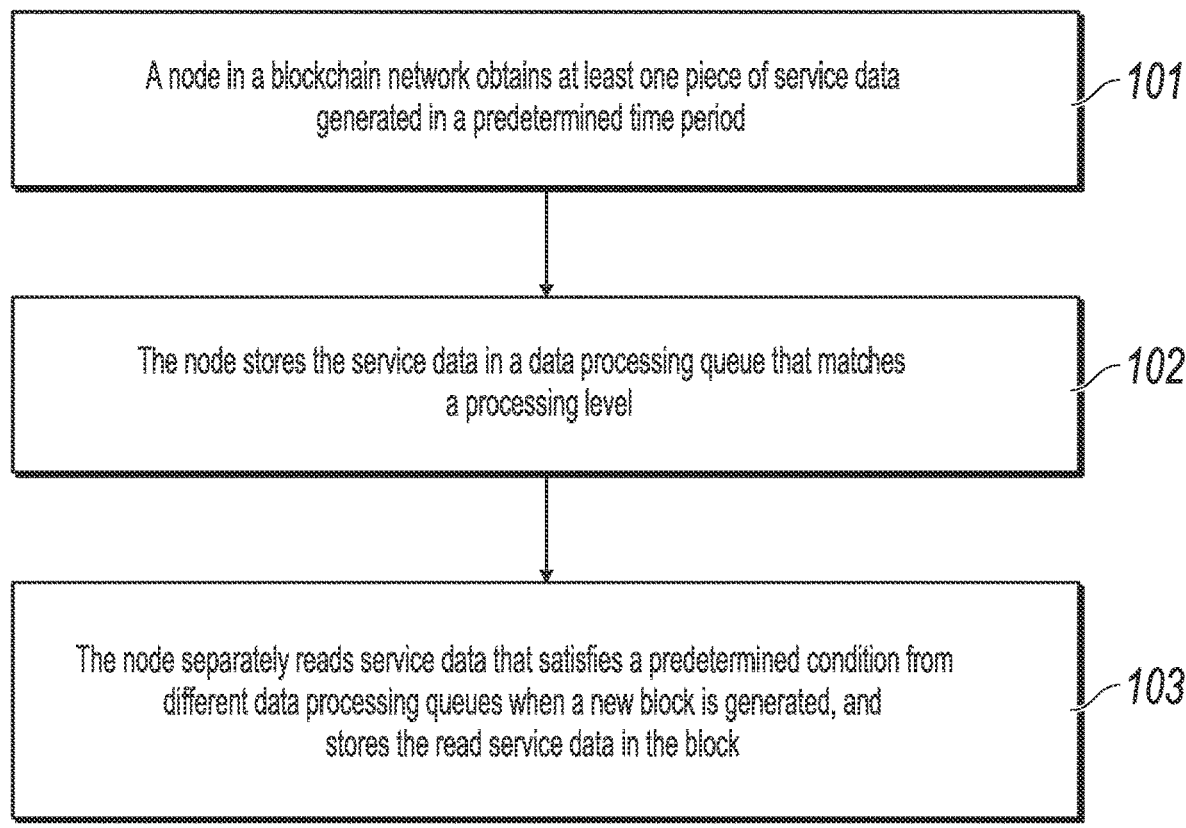
FIG. 1 is a flowchart illustrating a blockchain-based data processing method, according to an implementation of the present application.

FIG. 1 is a schematic flowchart illustrating a blockchain-based data processing method, according to an implementation of the present application. The method can be described as follows. The execution body in this implementation of the present application can be any service node (which can also be referred to as a blockchain node, and is simply referred to as a node below) in a blockchain network, and is not limited here. In this implementation of the present application, an example that the execution body is a node is used for description in detail.

Step 101: A node in the blockchain network obtains at least one piece of service data generated in a predetermined time period.

The service data includes a processing level of a service that generates the service data.

In this implementation of the present application, first, service priorities are determined for different services. Here, a service priority corresponds to a processing level of service data, that is, a higher service priority indicates a higher processing level of the service data generated for the service. Then, a field that represents a service priority (or a processing level) of a service that service data is generated for is added to the service data. As such, after receiving the service data, the node can determine the processing level of the service data by using the field.

Usually, fields included in the service data include but are not limited to a hash value, a version number, a public key, a signature, a hash value of a block that the service data belongs, a timestamp (that is, a time when the node processes the service data), etc. In this case, the fields included in the service data described in this implementation of the present application include but are not limited to those shown in Table 1. Some attributes of the fields are described in Table 1.

TABLE 1

| Field Name | Attribute Description |
|---|---|
| Hash value | Indicates a unique identifier of each piece of service data |
| Version number | Indicates a version identifier of a service data generation mechanism |
| Public key | Indicates a public key of a transaction initiation party |
| Signature | Indicates the information obtained by a service initiation party by signing with a private key, where if the signature is verified by a public key, it indicates that the service is valid |
| Service information | Indicates the specific service information that corresponds to the service data, such as a fund flow and a change of capital ownership, which is written by a transaction initiation party |
| Hash of a block that the service data belongs | Indicates the hash value of the block that the service data belongs if the service data is included in a consensus; and indicates null if the service data is not included in a consensus. |
| Timestamp | Indicates a time when the service data is processed by the node (determined in precision of milliseconds) |
| ... | ... |

Preferably, in this implementation of the present application, data processing queues can be further configured for different service priorities based on determined service priorities. As such, when receiving the service data, the service data can be separately stored based on service priorities.

In this implementation of the present application, service priorities divided into a "high" service priority and a "low" service priority are used as an example for subsequent description. If service priorities are divided into a "high" service priority and a "low" service priority, correspondingly, processing levels are also divided into a "high" processing level and a "low" processing level.

It is worthwhile to note that because there is a time interval between two adjacent blocks in a blockchain, this time interval can be used as a reference condition for setting a time period in this implementation of the present application. Implementations are not limited here.

Step 102: The node stores the service data in a data processing queue that matches a processing level.

In this implementation of the present application, because different data processing queues can be created in advance based on service priorities of services (or processing levels of services), a mapping relationship between a processing level and an identifier of a data processing queue can be established in advance.

When receiving service data, the node extracts a processing level of the service data (such extraction can include reading a processing level field in the service data and determining a processing level of the service data based on the processing level field), determines a data processing queue that corresponds to the processing level included in the service data based on a pre-established mapping relationship between a processing level and an identifier of a data processing queue, and stores the service data in the determined data processing queue.

Figure 2:
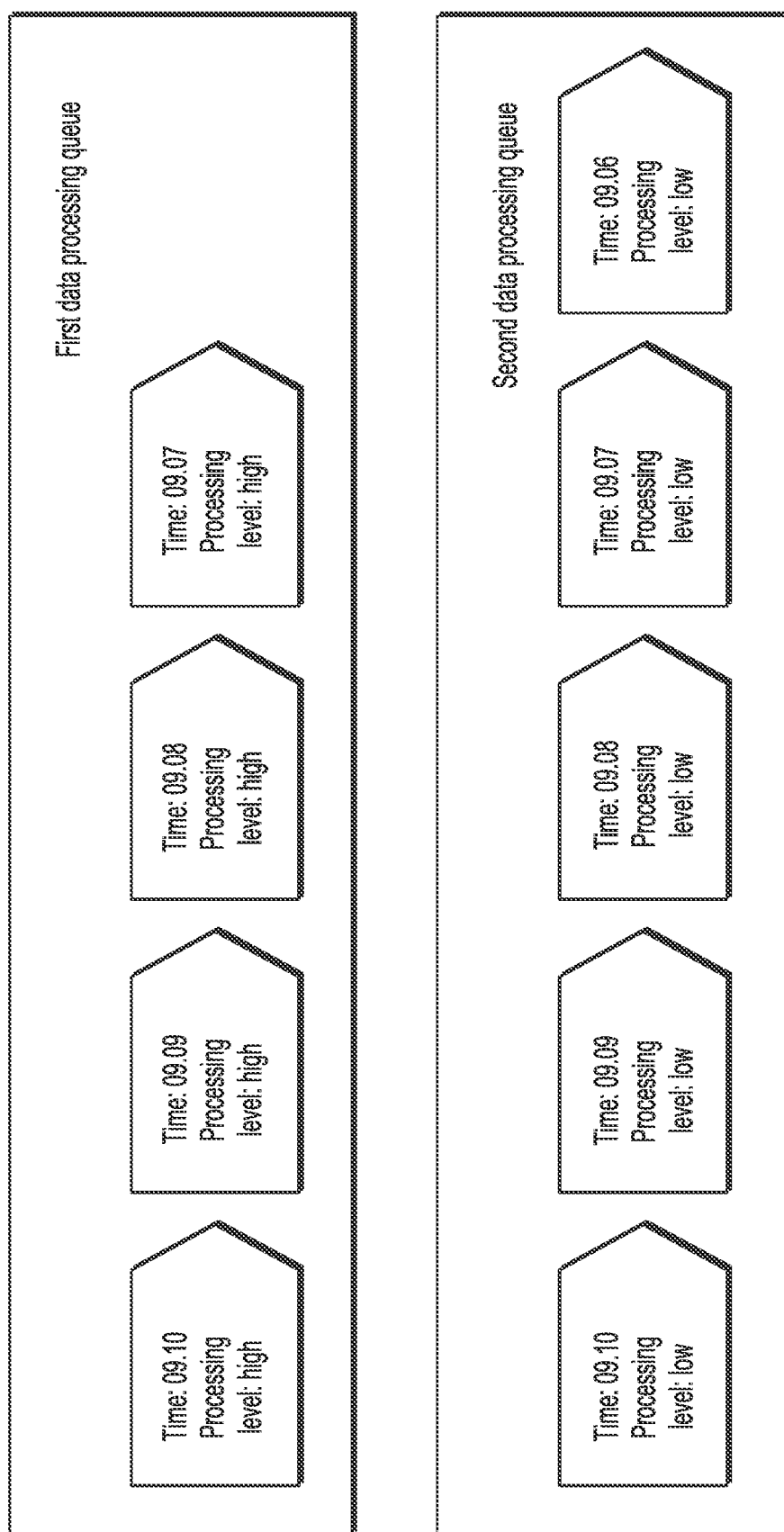
FIG. 2(a) is a diagram illustrating a data processing queue that corresponds to service data with different processing levels, according to an implementation of the present application.
FIG. 2(b) is a diagram illustrating a data processing queue that corresponds to service data with different processing levels, according to an implementation of the present application.
Figure 2:
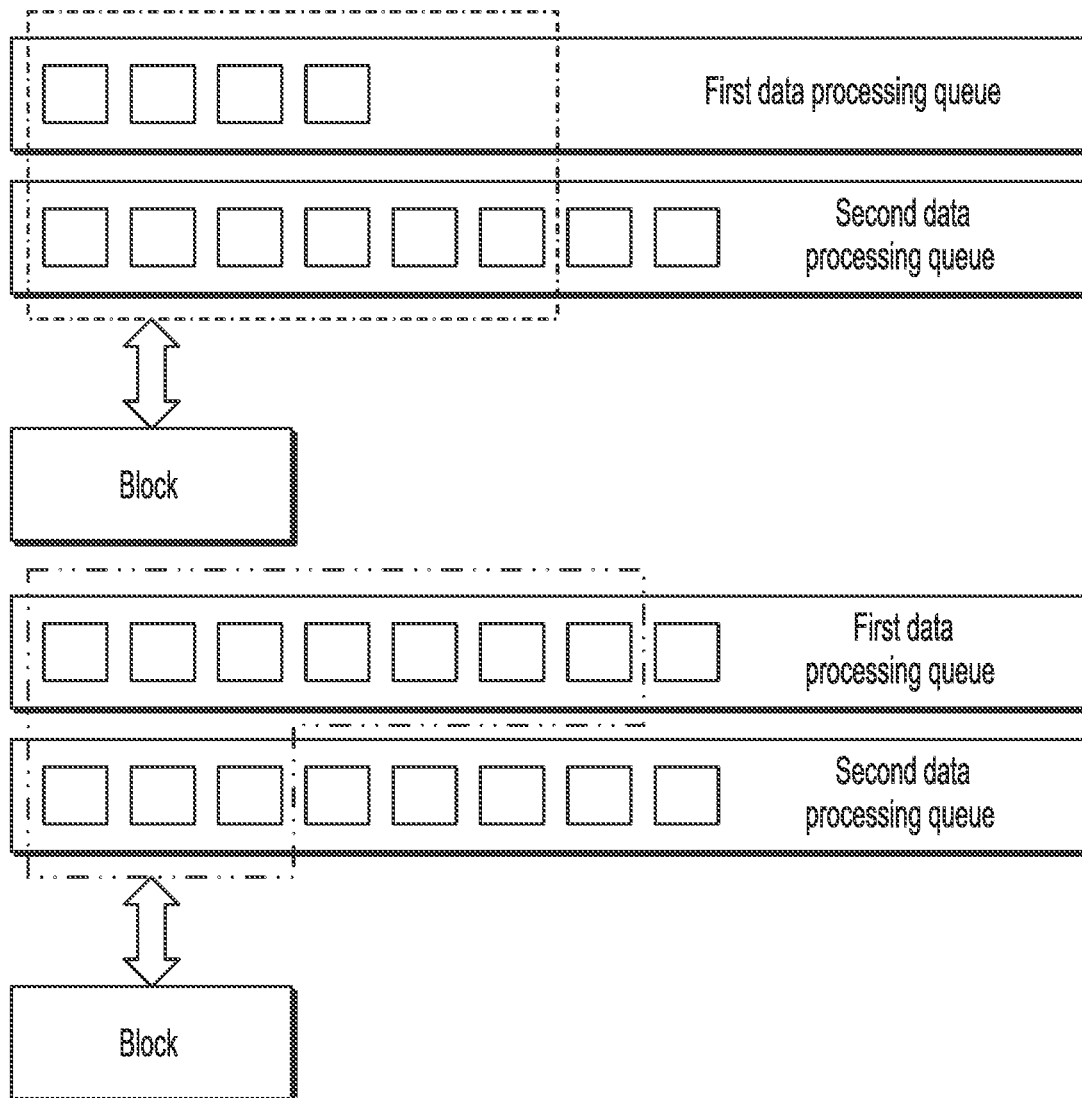

FIG. 2(a) is a schematic diagram illustrating a data processing queue that corresponds to service data with different processing levels, according to an implementation of the present application. It can be seen from FIG. 2(a) that two data processing queues are included. One data processing queue corresponds to a high processing level, that is, the service data stored in the data processing queue is generated for a service with a high service priority (or a high service processing level). The other data processing queue corresponds to a low processing level, that is, the service data stored in the data processing queue is generated for a service with a low service priority (or a low service processing level).

It is worthwhile to note that service data stored in the data processing queue can be arranged based on processing times of the service data, or can be arranged based on service attributes included in the service data, or can be arranged based on a queue principle (a first in first out principle). Implementations are not limited here.

Step 103: The node separately reads service data that satisfies a predetermined condition from different data processing queues when a new block is generated, and stores the read service data in the block.

In this implementation of the present application, each node in the blockchain network processes service data in two stages. A first stage can correspond to step 101 and step 102 in this implementation of the present application. A second stage can correspond to step 103 in this implementation of the present application, that is, storing the service data in the block. It is worthwhile to note that the solution described in this implementation of the present application focuses on describing specific service data that is read from different data processing queues to be stored in a block, and therefore verification, consensus, etc. are omitted for simplicity in this implementation of the present application. Such processing ways can be performed based on the existing technology.

Preferably, the predetermined condition described in this implementation of the present application can be determined based on a storage capacity of the block and a predetermined processing ratio of service data with different processing levels, or can be determined in other ways, provided that it is ensured that the service data of the different service processing levels can be written evenly into the block.

The following describes in detail how the node separately reads the service data that satisfies the predetermined condition from the different data processing queues.

The node separately performs the following operations for the different data processing queues: determining a processing level that corresponds to a first data processing queue; if the processing level is a first processing level, determining a predetermined processing ratio of service data with a second processing level, where the first processing level is higher than the second processing level; determining a first processing quantity of service data with the first processing level based on the determined processing ratio and the storage capacity of the block; and sequentially reading service data that satisfies the first processing quantity from the first data processing queue based on the first processing quantity.

It is worthwhile to note that "first" and "second" included in the "first data processing queue" and "second data processing queue" described in this implementation of the present application have no special meanings and merely represent different data processing queues.

"first" and "second" included in the "first processing level" and "second processing level" described in this implementation of the present application have no special meanings and merely represent two different processing levels. In this implementation of the present application, assume that the first processing level is higher than the second processing level.

It is worthwhile to note that "first" and "second" included in the "first processing quantity" and "second processing quantity" described in this implementation of the present application have no special meanings and merely represent different quantities.

The first data processing queue is used as a research object.

Step 1: Determine a processing level that corresponds to the first data processing queue.

Step 2: Determine whether the processing level is the first processing level or the second processing level, if the processing level is the first processing level, perform step 3, and if the processing level is the second processing level, perform step 4.

Step 3: Determine the predetermined processing ratio of the service data with the second processing level, and determine the first processing quantity of the service data with the first processing level based on the determined processing ratio and the storage capacity of the block; and sequentially read the service data that satisfies the first processing quantity from the first data processing queue based on the first processing quantity.

Step 4: Determine the predetermined processing ratio of the service data with the second processing level, and determine the second processing quantity of the service data with the second processing level based on the determined processing ratio and the storage capacity of the block; and sequentially read the service data that satisfies the second processing quantity from the first data processing queue based on the second processing quantity.

It is worthwhile to note that, in this implementation of the present application, "the predetermined processing ratio of the service data with the second processing level" can be understood as a minimum ratio of service data with a relatively low processing level in this implementation of the present application, that is, a ratio of a capacity occupied by a minimum quantity of service data with a relatively low processing level that needs to be stored relative to a storage capacity of a block when data is stored in the block this time. The processing ratio here can be adjusted based on actual demands. Implementations are not limited here.

Assume that the predetermined processing ratio of the service data with the second processing level is p, the storage capacity (which can also be understood as an upper limit quantity of service data that can be carried by the block) of the block is x. In this case, it is determined that the first processing quantity of the service data with the first processing level can be expressed as $(1-p) \times x$, and the second processing quantity of the service data with the second processing level can be expressed as $px$.

There is another case in this implementation of the present application, that is, a processing quantity of service data stored in the first data processing queue is less than the first processing quantity, which means that after the first processing quantity is determined, the service data stored in the first data processing queue cannot satisfy the requirement of the first processing quantity. To implement proper use of resources, in this case, the service data is sequentially read from the first data processing queue based on the processing quantity of the service data stored in the first data processing queue. That is, all the service data stored in the first data processing queue is read.

In this case, a processing quantity of service data is read from a second data processing queue based on the processing quantity of the service data stored in the first data processing queue and the storage capacity of the block, and service data is sequentially read from the second data processing queue based on the determined processing quantity of the service data read from the second data processing queue.

The previous described expression is still used as an example here. Assume that the processing quantity of the service data stored in the first data processing queue is m. Because a value that corresponds to (1−p)×x is greater than m, the first processing quantity should be m. As such, the determined second processing quantity should be (x−m). That is, when a quantity of service data with a relatively high service priority is relatively small, it can be ensured that service data with a relatively high service priority can be preferentially processed, and service data with a relatively low service priority can be processed as much as possible.

In this implementation of the present application, the sequentially reading service data that satisfies the first processing quantity from the first data processing queue includes the following: sequentially reading the service data that satisfies the first processing quantity from the first data processing queue based on order of a corresponding processing time of the service data.

Similarly, service data that satisfies the second processing quantity can also be sequentially read from the second data processing queue based on order of a corresponding processing time of the service data.

In this implementation of the present application, the storing the read service data in the block includes the following: sequentially storing the read service data in the block based on the order of the corresponding processing time of the service data.

For example, FIG. 2(b) is a schematic diagram illustrating a data processing queue that corresponds to service data with different processing levels, according to an implementation of the present application. It can be seen from FIG. 2(b) that different quantities of service data are sequentially read from the two data processing queues in the way described in step 103.

Assume that a predetermined processing ratio of storing service data with a relatively low processing level in a block is 30% each time, and a storage capacity of the block is 10, that is, 10 pieces of service data can be stored. Four pieces of service data are stored in a data processing queue with a high processing level, and eight pieces of service data are stored in a data processing queue with a low processing level. It is determined that the processing amount of the service data with the high processing level that needs to be selected is (1−30%)×10=7 according to a system configuration policy. Apparently, 4 is less than 7. Therefore, all the four pieces of service data stored in the data processing queue with the high processing level are retrieved, and six pieces of service data are retrieved from the data processing queue with the low processing level. The 10 pieces of obtained service data are stored in the block based on the processing times of the service data.

Assume that a predetermined processing ratio of storing service data with a relatively low processing level in a block is 30% each time, and a storage capacity of the block is 10, that is, 10 pieces of service data can be stored. Eight pieces of service data are stored in a data processing queue with a high processing level, and eight pieces of service data are stored in a data processing queue with a low processing level. It is determined that the processing amount of the service data with the high processing level that needs to be selected is (1−30%)×10=7 according to a system configuration policy. Apparently, 8 is greater than 7. Therefore, seven pieces of service data are retrieved from the data processing queue with the high processing level, and three pieces of service data are retrieved from the data processing queue with the low processing level. The 10 pieces of obtained service data are stored in the block based on the processing times of the service data.

In this implementation of the present application, the node can also separately reads the service data that satisfies the predetermined condition from the different data processing queues in the following method: separately performing, by the node, the following operations for the different data processing queues: determining a processing level that corresponds to a first data processing queue, and obtaining a predetermined processing ratio that corresponds to the processing level; and determining a processing quantity based on the determined processing ratio and the storage capacity of the block, and sequentially reading service data that satisfies the processing quantity from the first data processing queue.

For each data processing queue, a processing level that corresponds to the data processing queue is determined, and further a processing ratio that corresponds to the data processing queue is determined based on a predetermined processing ratio that corresponds to a processing level. A processing quantity is determined based on the determined processing ratio and the storage capacity of the block, and service data that satisfies the processing quantity is sequentially read from the data processing queue.

For example, n data processing queues are included, and the n data processing queues correspond to n processing levels. Processing ratios that correspond to different processing levels can be represented by $a_i$, that is, a processing ratio that corresponds to the first processing level is $a_1$, a processing ratio that corresponds to an $i^{th}$ processing level is $a_i$, and a processing ratio that corresponds to an $n^{th}$ processing level is $a_n$, and $(a_1+a_2+\ldots+a_n)=1$. For each data processing queue, if a storage capacity of a block is X, a processing quantity that corresponds to the data processing queue with the first processing level is $a_1 \times X$, a processing quantity that corresponds to the data processing queue with the $i^{th}$ processing level is $a_i \times X$, and a processing quantity that corresponds to the data processing queue with the $n^{th}$ processing level is $a_n \times X$.

According to the technical solution provided in this implementation of the present application, different service data is stored in different data processing queues based on processing levels, and a predetermined quantity of service data is read from the different data processing queues based a predetermined condition when storing data in a block, so that the service data with the different processing levels can be processed, an existing-technology rule of processing service data only based on time can be broken, and an existing-technology issue of low efficiency of processing a service with a relatively high service priority can be alleviated. The solution provided in implementations of the present application not only ensures efficiency of processing service data of a service with a high service priority, but also ensures efficiency of processing service data of a service with a low service priority. When a service processing priority is satisfied, the flexibility of processing service data in a blockchain is increased, and the use value of the blockchain in the service application field is also improved.

Figure 3:
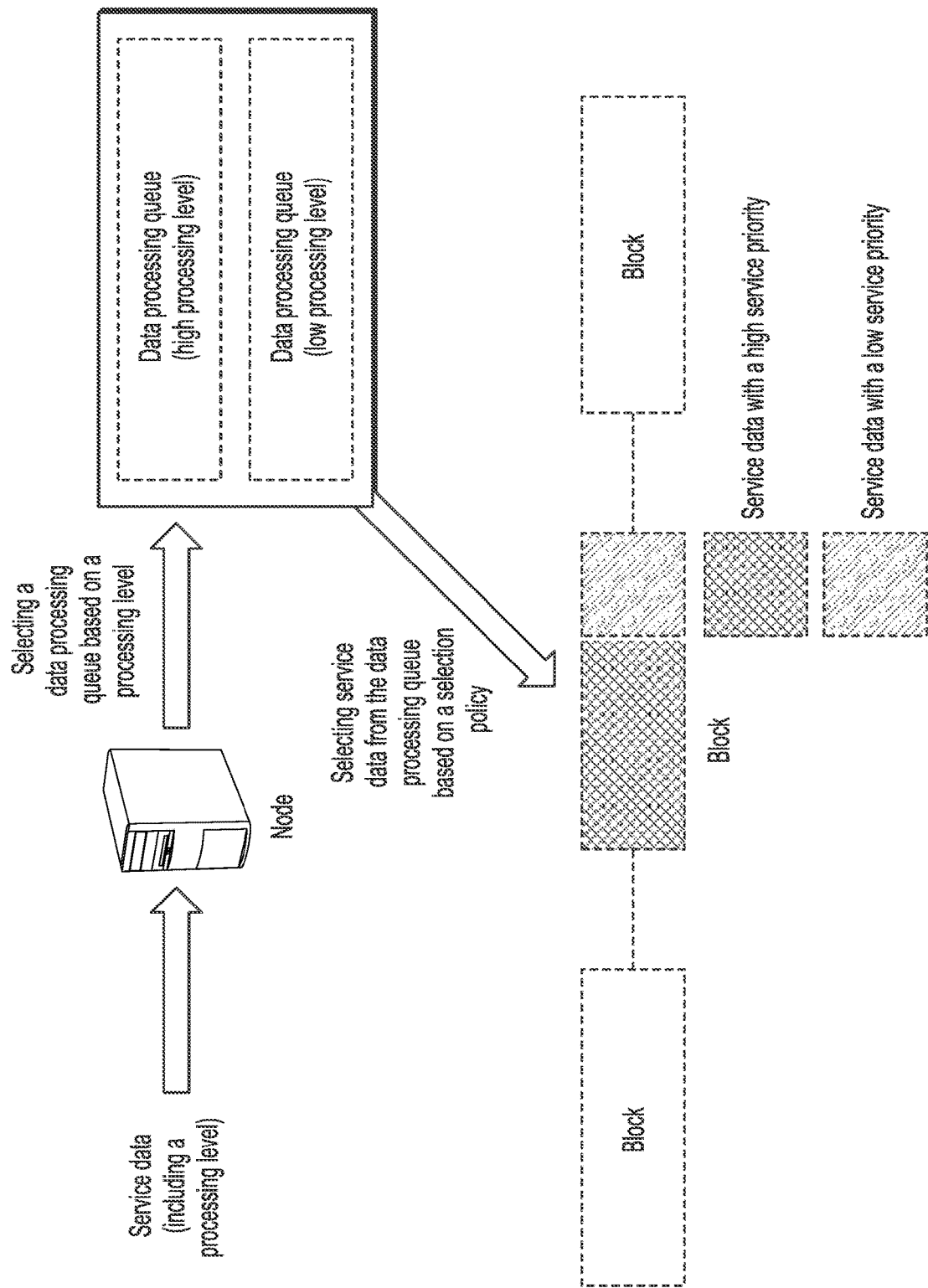
FIG. 3 is a diagram illustrating a scenario of a blockchain-based data processing method, according to an implementation of the present application.

FIG. 3 is a diagram illustrating a scenario of a blockchain-based data processing method, according to an implementation of the present application. It can be seen from FIG. 3 that when receiving service data, a node in a blockchain network can select a data processing queue for the service data based on a processing level of the service data, and write the service data into the data processing queue. When a new block is generated, the node selects service data from different data processing queues based on a service data selection policy (that is, the way described in step 103 in the previously described implementation), and stores the selected service data in the block.

Implementation 2

Figure 4:
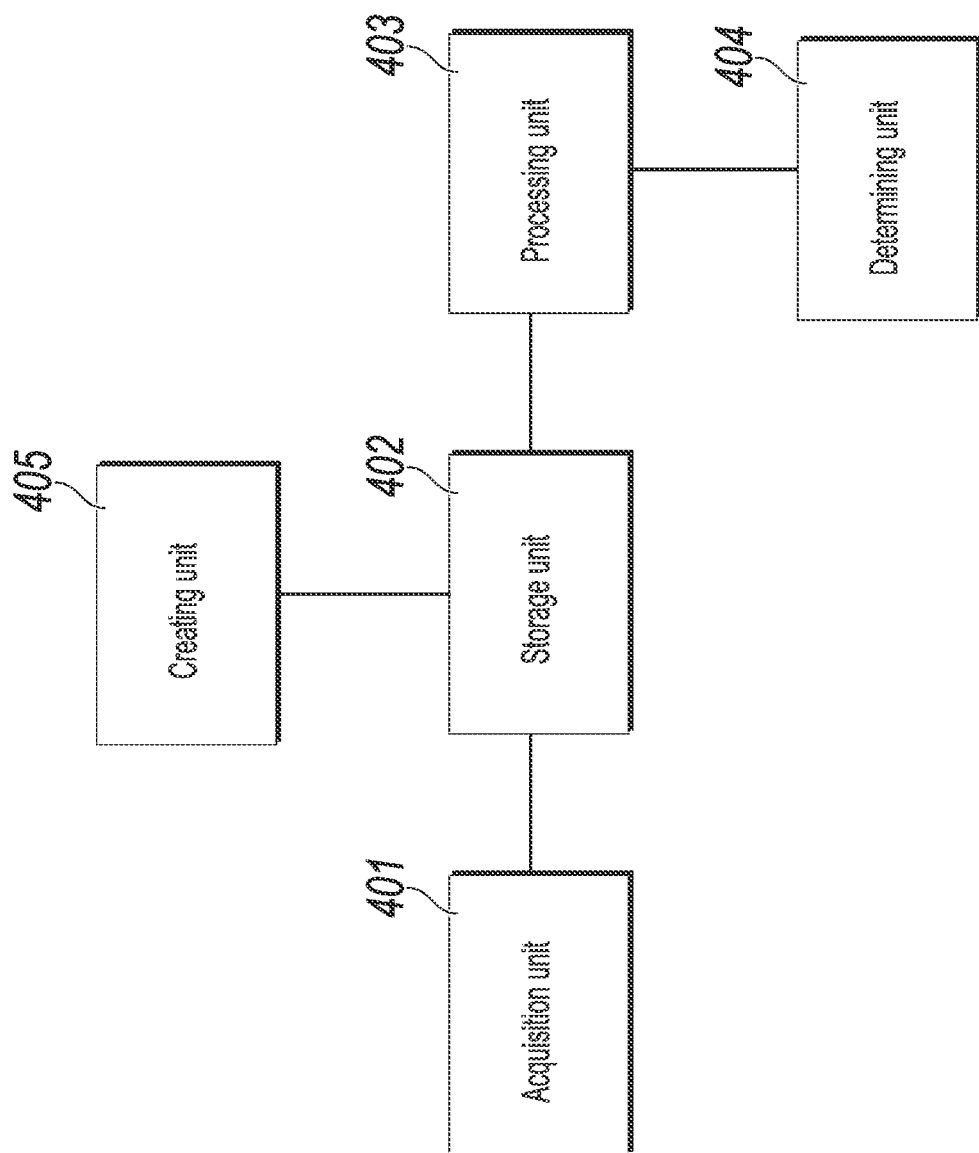
FIG. 4 is a diagram illustrating an example of a structure of a blockchain-based data processing device, according to an implementation of the present application.

FIG. 4 is a schematic structural diagram illustrating a blockchain-based data processing device, according to an implementation of the present application. The data processing device includes an acquisition unit 401, a storage unit 402, and a processing unit 403.

The acquisition unit 401 is configured to obtain at least one piece of service data generated in a predetermined time period, where the service data includes a processing level of a service that generates the service data.

The storage unit 402 is configured to store the service data in a data processing queue that matches the processing level.

The processing unit 403 is configured to separately read service data that satisfies a predetermined condition from different data processing queues when a new block is generated, and store the read service data in the block.

In another implementation of the present application, the predetermined condition is determined based on a storage capacity of the block and a predetermined processing ratio of service data with different processing levels.

In another implementation of the present application, the processing unit 403 separately reads service data that satisfies a predetermined condition from different data processing queues, including the following: separately performing the following operations for the different data processing queues: determining a processing level that corresponds to a first data processing queue; if the processing level is a first processing level, determining a predetermined processing ratio of service data with a second processing level, where the first processing level is higher than the second processing level; determining a first processing quantity of service data with the first processing level based on the determined processing ratio and the storage capacity of the block; and sequentially reading service data that satisfies the first processing quantity from the first data processing queue based on the first processing quantity.

In another implementation of the present application, the processing unit 403 sequentially reads service data that satisfies the first processing quantity from the first data processing queue based on the first processing quantity, including the following: when a processing quantity of service data stored in the first data processing queue is less than the first processing quantity, sequentially reading service data from the first data processing queue based on the processing quantity of the service data stored in the first data processing queue.

In another implementation of the present application, the data processing device further includes a determining unit 404.

The determining unit 404 determines a processing quantity of service data read from a second data processing queue based on the processing quantity of the service data stored in the first data processing queue and the storage capacity of the block; and sequentially reads service data from the second data processing queue based on the determined processing quantity of the service data read from the second data processing queue.

In another implementation of the present application, the processing unit 403 further determines the predetermined processing ratio of the service data with the second processing level if the processing level is the second processing level; determines a second processing quantity of the service data with the second processing level based on the determined processing ratio and the storage capacity of the block; and sequentially reads service data that satisfies the second processing quantity from the first data processing queue based on the second processing quantity.

In another implementation of the present application, the processing unit 403 sequentially reads service data that satisfies the first processing quantity from the first data processing queue, including the following: sequentially reading the service data that satisfies the first processing quantity from the first data processing queue based on order of a corresponding processing time of the service data.

In another implementation of the present application, the processing unit 403 stores the read service data in the block, including the following: sequentially storing the read service data in the block based on the order of the corresponding processing time of the service data.

In another implementation of the present application, the data processing device further includes a creating unit 405.

The creating unit 405 creates different data processing queues in advance based on processing levels of services.

The storage unit 402 stores the service data in a data processing queue that matches the processing level, including the following: determining the data processing queue that corresponds to the processing level included in the service data based on a mapping relationship between a processing level and a data processing queue; and storing the service data in the determined data processing queue.

In another implementation of the present application, the processing unit 403 separately reads service data that satisfies a predetermined condition from different data processing queues, including the following: separately performing the following operations for the different data processing queues: determining a processing level that corresponds to a first data processing queue, and obtaining a predetermined processing ratio that corresponds to the processing level; and determining a processing quantity based on the determined processing ratio and the storage capacity of the block, and sequentially reading service data that satisfies the processing quantity from the first data processing queue.

It is worthwhile to note that, the data processing device provided in this implementation of the present application can be implemented by using software or hardware. Implementations are not limited here. The data processing device stores different service data in different data processing queues based on processing levels, and reads a predetermined quantity of service data from the different data processing queues based a predetermined condition when storing data in a block, so that the service data with the different processing levels can be processed, an existing-technology rule of processing service data only based on time can be broken, and an existing-technology issue of low efficiency of processing a service with a relatively high service priority can be alleviated. The solution provided in implementations of the present application not only ensures efficiency of processing service data of a service with a high service priority, but also ensures efficiency of processing service data of a service with a low service priority. When a service processing priority is satisfied, the flexibility of processing service data in a blockchain is increased, and the use value of the blockchain in the service application field is also improved.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicon Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so that the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the computing device. Based on the definition in the present specification, the computer-readable medium does not include transitory computer-readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such a process, method, product or device. Without more constraints, an element preceded by "includes a . . . " does not preclude the existence of additional identical elements in the process, method, product or device that includes the element.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Figure 5:
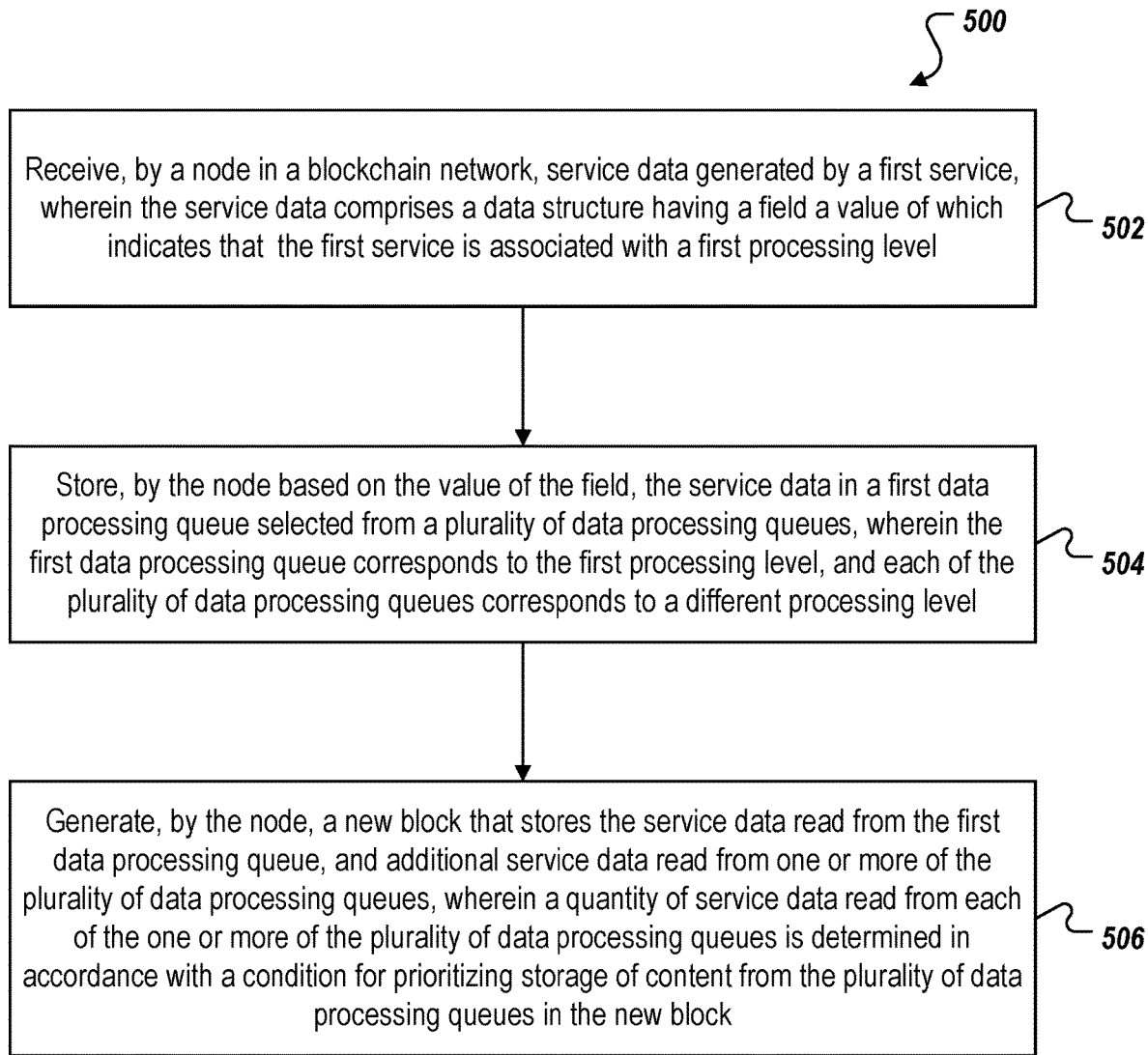
FIG. 5 is a flowchart illustrating an example of a computer-implemented method for processing blockchain data, according to an implementation of the present disclosure.

FIG. 5 is a flowchart illustrating an example of a computer-implemented process 500, according to an implementation of the present disclosure. For clarity of presentation, the description that follows generally describes the process 500 in the context of the other figures in this description. However, it will be understood that the process 500 can be performed, for example, by various combinations of systems, environments, software, and hardware, as described herein. In some implementations, various steps of method 500 can be run in parallel, in combination, in loops, or in other orders.

At 502, service data generated by a first service is received by a node in a blockchain network, wherein the service data includes a data structure having a field a value of which indicates that the first service is associated with a first processing level. Fields included in the data structure include but are not limited to a hash value, a version number, a public key, a signature, a hash value of a block that the service data belongs, a timestamp (that is, a time when the node processes the service data), etc. In some implementations, a service priority corresponds to a processing level of service data, that is, a higher service priority indicates a higher processing level of the service data generated for the service. Then, a field that represents a service priority (or a processing level) of a service is added to the data structure of the service data. As such, after receiving the service data, the node can determine the processing level of the service data by using the field. In some cases, service priorities for different services are determined, wherein a service priority corresponds to a processing level of service data generated by a corresponding service. As such, when receiving the service data, the service data can be separately stored based on service priorities, which are determined by using the field.

At 504, the service data in a first data processing queue selected from a plurality of data processing queues is stored by the node based on the value of the field, wherein the first data processing queue corresponds to the first processing level, and each of the plurality of data processing queues corresponds to a different processing level. In some cases, the plurality of data processing queues are created in advance based on the service priorities for different services generating service data to be stored. In some examples, stored service data is arranged in the first data processing queue based on processing times of the stored service data or based on service attributes included in the stored service data.

At 506, a new block that stores the service data read from the first data processing queue and additional service data read from one or more of the plurality of data processing queues is generated by the node, wherein a quantity of service data read from each of the one or more of the plurality of data processing queues is determined in accordance with a condition for prioritizing storage of content from the plurality of data processing queues in the new block. In some cases, the condition specifies a fraction of a storage capacity of the new block that is allocated to each of the one or more of the plurality of data processing queues. In some examples, the method includes determining, based on a first fraction allocated to the first data processing queue, a first quantity of service data to be read from the first data processing queue, determining, based on a second fraction allocated to a second data processing queue of the plurality of data processing queues, a second quantity of service data to be read from the second data processing queue, and storing the first quantity of service data from the first data processing queue and the second quantity of service data from the second data processing queue in the new block. For example, assume that the first fraction allocated to the first data processing queue is p, the second fraction allocated to the second data processing queue is 1−p, and that the storage capacity of the new block is x, then the first quantity of service data is px and the second quantity of service data is (1−p)xx. In some implementations, the method includes determining that a total amount of service data stored in the first data processing queue is less than the first quantity of service data, storing the total amount of service data from the first data processing queue in the new block, and storing, in the new block, a third quantity of service data read from one or more of the plurality of data processing queues, the third quantity representing a difference between the first quantity and the total amount of service data stored in the first data processing queue. In some cases, at least a portion of the third quantity of service data is read from the second data processing queue. In some examples, storing the first quantity of service data from the first data processing queue includes reading the first quantity of service data from the first data processing queue based on an order of corresponding processing times of the service data, and storing the first quantity of service data in the new block based on the order of corresponding processing times of the service data.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same.

Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A method, comprising:
    receiving, by a node in a blockchain network, service data generated by a first service, wherein the service data comprises a data structure having a field a value of which indicates that the first service is associated with a first processing level;
    storing, by the node based on the value of the field, the service data in a first data processing queue selected from a plurality of data processing queues, wherein the first data processing queue corresponds to the first processing level, and each of the plurality of data processing queues corresponds to a different processing level;
    determining a first quantity of service data to be read from the first data processing queue;
    determining a second quantity of service data to be read from a second data processing queue of the plurality of data processing queues; and
    generating, by the node, a new block that stores the first quantity of service data from the first data processing queue and the second quantity of service data from the second data processing queue,
    wherein a quantity of service data read from each of the one or more of the plurality of data processing queues is determined in accordance with a condition for prioritizing storage of content from the plurality of data processing queues in the new block.

2. The method according to claim 1, comprising:
    determining that a total amount of service data stored in the first data processing queue is less than the first quantity of service data;
    storing the total amount of service data from the first data processing queue in the new block; and
    storing, in the new block, a third quantity of service data read from one or more of the plurality of data processing queues, the third quantity representing a difference between the first quantity and the total amount of service data stored in the first data processing queue.

3. The method according to claim 2, wherein at least a portion of the third quantity of service data is read from the second data processing queue.

4. The method according to claim 1, further comprising:
    determining service priorities for different services, wherein a service priority corresponds to a processing level of service data generated by a corresponding service.

5. The method according to claim 4, further comprising:
    creating the plurality of data processing queues in advance based on the service priorities for different services generating service data to be stored.

6. The method according to claim 1, further comprising:
    arranging stored service data in the first data processing queue based on processing times of the stored service data or based on service attributes comprised in the stored service data.

7. The method according to claim 1, wherein storing the first quantity of service data from the first data processing queue comprises:
    reading the first quantity of service data from the first data processing queue based on an order of corresponding processing times of the service data; and
    storing the first quantity of service data in the new block based on the order of corresponding processing times of the service data.

8. A non-transitory, computer-readable medium storing one or more instructions executable by a computer system to perform operations, comprising:
    receiving, by a node in a blockchain network, service data generated by a first service, wherein the service data comprises a data structure having a field a value of which indicates that the first service is associated with a first processing level;
    storing, by the node based on the value of the field, the service data in a first data processing queue selected from a plurality of data processing queues, wherein the first data processing queue corresponds to the first processing level, and each of the plurality of data processing queues corresponds to a different processing level;
    determining a first quantity of service data to be read from the first data processing queue;
    determining a second quantity of service data to be read from a second data processing queue of the plurality of data processing queues; and
    generating, by the node, a new block that stores the first quantity of service data from the first data processing queue and the second quantity of service data from the second data processing queue,
    wherein a quantity of service data read from each of the one or more of the plurality of data processing queues is determined in accordance with a condition for prioritizing storage of content from the plurality of data processing queues in the new block.

9. The non-transitory, computer-readable medium according to claim 8, wherein the operations comprise:
    determining that a total amount of service data stored in the first data processing queue is less than the first quantity of service data;
    storing the total amount of service data from the first data processing queue in the new block; and storing, in the new block, a third quantity of service data read from one or more of the plurality of data processing queues, the third quantity representing a difference between the first quantity and the total amount of service data stored in the first data processing queue.

10. The non-transitory, computer-readable medium according to claim 9, wherein at least a portion of the third quantity of service data is read from the second data processing queue.

11. The non-transitory, computer-readable medium according to claim 8, wherein the operations comprise:
determining service priorities for different services, wherein a service priority corresponds to a processing level of service data generated by a corresponding service.

12. The non-transitory, computer-readable medium according to claim 11, wherein the operations comprise:
creating the plurality of data processing queues in advance based on the service priorities for different services generating service data to be stored.

13. The non-transitory, computer-readable medium according to claim 8, wherein the operations comprise:
arranging stored service data in the first data processing queue based on processing times of the stored service data or based on service attributes comprised in the stored service data.

14. The non-transitory, computer-readable medium according to claim 8, wherein storing the first quantity of service data from the first data processing queue comprises:
reading the first quantity of service data from the first data processing queue based on an order of corresponding processing times of the service data; and
storing the first quantity of service data in the new block based on the order of corresponding processing times of the service data.

15. A system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a node in a blockchain network, service data generated by a first service, wherein the service data comprises a data structure having a field a value of which indicates that the first service is associated with a first processing level;
storing, by the node based on the value of the field, the service data in a first data processing queue selected from a plurality of data processing queues, wherein the first data processing queue corresponds to the first processing level, and each of the plurality of data processing queues corresponds to a different processing level;
determining a first quantity of service data to be read from the first data processing queue;
determining a second quantity of service data to be read from a second data processing queue of the plurality of data processing queues; and
generating, by the node, a new block that stores the first quantity of service data from the first data processing queue and the second quantity of service data from the second data processing queue,
wherein a quantity of service data read from each of the one or more of the plurality of data processing queues is determined in accordance with a condition for prioritizing storage of content from the plurality of data processing queues in the new block.

16. The system according to claim 15, wherein the operations comprise:
determining that a total amount of service data stored in the first data processing queue is less than the first quantity of service data;
storing the total amount of service data from the first data processing queue in the new block; and
storing, in the new block, a third quantity of service data read from one or more of the plurality of data processing queues, the third quantity representing a difference between the first quantity and the total amount of service data stored in the first data processing queue.

17. The system according to claim 16, wherein at least a portion of the third quantity of service data is read from the second data processing queue.

18. The system according to claim 15, further comprising:
determining service priorities for different services, wherein a service priority corresponds to a processing level of service data generated by a corresponding service.

19. The system according to claim 18, further comprising:
creating the plurality of data processing queues in advance based on the service priorities for different services generating service data to be stored.

20. The system according to claim 15, further comprising:
arranging stored service data in the first data processing queue based on processing times of the stored service data or based on service attributes comprised in the stored service data.

* * * * *